No. 701,779. Patented June 3, 1902.
J. M. WALTOM.
PLANTER.
(Application filed Dec. 5, 1901.)
(No Model.)
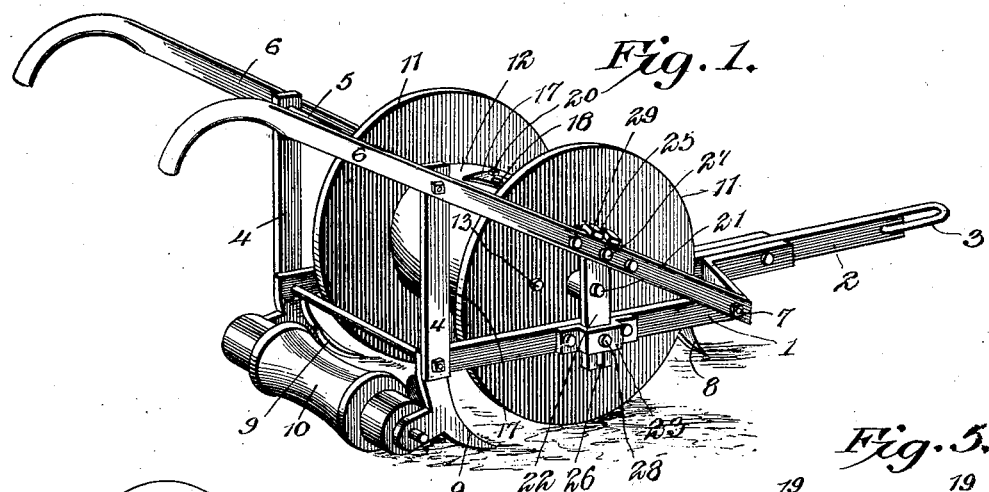
J. M. Waltom, Inventor.

UNITED STATES PATENT OFFICE.

JESSE MOODY WALTOM, OF STEPHENVILLE, TEXAS.

PLANTER.

SPECIFICATION forming part of Letters Patent No. 701,779, dated June 3, 1902.

Application filed December 5, 1901. Serial No. 84,823. (No model.)

*To all whom it may concern:*

Be it known that I, JESSE MOODY WALTOM, a citizen of the United States, residing at Stephenville, in the county of Erath and State of Texas, have invented a new and useful Planter, of which the following is a specification.

This invention relates to planters of that type embodying a rotatable hopper which is carried by the supporting-wheels of the device, and has for its object to provide an improved hopper of this character wherein all of the seed, to the very last particle, may be conveniently and effectually dropped. It is furthermore designed to mount the rotatable hopper so that it will not be interfered with should the supporting-wheels strike an obstruction.

Another object is to mount the wheels and the rotatable hopper so that the wheels may yield in a vertical direction to any obstruction, thereby to obviate stopping of the wheels and to insure a proper continous dropping of the seed from the hopper.
With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view of a seed-planter constructed and arranged in accordance with the present invention. Fig. 2 is a longitudinal sectional view thereof. Fig. 3 is a cross-sectional view taken on the line 3 3 of Fig. 2. Fig. 4 is a detail perspective view of one of the yieldable bearings for the supporting-wheels, and Fig. 5 is a detail view of one of the adjustable cut-off slides for the discharge-openings of the seed-hopper.

Like characters of reference designate corresponding parts in all the figures of the drawings.

Referring to the accompanying drawings, 1 designates a substantially rectangular frame which is open at its rear end and is provided at its forward end with a rigid forwardly-extending draft-bar 2, having a terminal hook or link 3, to which a draft-animal is designed to be connected. From the rear of each side of the frame rises a standard 4, the tops of the standards being connected by a cross-bar 5. The handle members 6 are applied to the opposite sides of the frame and have their front ends connected thereto by means of a cross bar or rod 7, said handles inclining upwardly and rearwardly across the outer sides of the upper ends of the standards, to which they are connected by means of a cross-bar 5, the opposite ends of which are projected through the handles. A suitable opener 8 is mounted at the front of the frame, and covering-plows 9 are carried by the lower ends of the standards. A concave covering-roller 10 is mounted between the lower ends of the standards.

Within the frame there are provided two supporting wheels or disks 11, which are connected by means of an intermediate concentric cylinder 12, which forms the seed-hopper and rotates simultaneously with the wheels. As best indicated in Fig. 3, it will be seen that the cylinder is rounded or convexed longitudinally and has its greatest diameter at the center thereof, and the discharge-openings for the seeds are provided at the central circumference of the cylindrical hopper, for the reason that the sides of the latter incline in opposite directions toward the central circumference of the hopper, and thereby automatically feed the seeds to the discharge-openings, and thus every particle of the seeds may be effectually dropped from the hopper. Suitable brace and agitating rods 13 extend between the wheels or heads of the cylinder, so as to brace the same, and are also located within the hopper, so as to effectually agitate the seeds therein, and there maintain the same in a loose condition, so as to be properly fed through the discharge-openings. A suitable inlet-opening 14 is formed in the hopper near one end thereof and is normally closed by means of a suitable closure-slide 15.

It will of course be understood that any desired number of discharge-openings 16 may be formed in the cylindrical hopper. To control the size of each opening so as to accommodate the same to seeds of different sizes, there is provided a cut-off slide comprising a plate 17, applied longitudinally to the outer side of the hopper and shaped to fit the same, the central portion of the plate being provided with an opening 18 to register with the discharge-opening in the cylinder and also provided adjacent to opposite ends with transverse slots or notches 19, intersecting one edge of the plate. Suitable set-screws 20 are carried by the cylinder and project through the slots or notches 19, so that the cut-off slide or plate may be adjusted laterally across the discharge-opening, and thereby to vary the size of the opening according to the size of the seed or the quantity thereof to be dropped.

The opposite supporting-wheels or the opposite heads of the cylindrical hopper are provided with corresponding outwardly-directed journals 21, which lie between the frame 1 and the respective handles 6 and are mounted in perforations formed in vertically-yieldable bearings 22 in contradistinction to those devices wherein the journals are mounted to move in slots. Each of these bearings consists of a plate, which has its lower end guided in a cuff 23, carried by the outer side of the adjacent frame member, and its upper end guided in a cuff 24, applied to the inner side of the adjacent handle member, the opposite ends of the plate being provided with the respective longitudinal bifurcations 25 and 26, which receive the guide pins or projections 27 and 28, respectively, which extend transversely across the cuffs, the upper end of the plate being bent laterally outward to form stop-flanges 29, lying above the handle and adapted to engage the upper edge thereof to limit the downward movement of the plate. It will be observed that the upper end of the plate is inclined to correspond with the inclination of the handle in order that the stop-flanges 29 may rest evenly upon the handle. By this arrangement it will be seen that the wheels and the cylindrical hopper are yieldable in a vertical direction, so that should the wheels strike an obstruction they are capable of yielding in a vertical direction, so as to pass over the obstruction without materially stopping the rotation of the hopper, and thereby without interfering with the dropping of the seed.

As best illustrated in Fig. 1, it will be seen that the coverers 9 are formed by downward extensions of the rear ends of the respective side bars 1 of the frame. While this formation is preferred, it will of course be understood that the coverers may be separate from the frame and connected to the standards 4 or the side bars 1, as may be desired. Furthermore, instead of mounting the covering-roller 10 in rearward extensions carried by the coverers the journals of the roller may be mounted directly upon the coverers themselves without departing from the spirit of the present invention.

It is also desired to call attention to the fact that the side bars of the frame and the handles are connected by means of rods having screw-threaded terminals to which are fitted nuts, whereby the wheels, rotary seed-hopper, and the covering-roller may be conveniently removed, so as to leave only the frame, the cultivator-shovels 8 and 9, and the handles, whereby the device may be conveniently converted into a cultivator.

What I claim is—

1. In a seed-planter, the combination with a frame, of opposite supporting-wheels having journals, vertically-yieldable bearings carrying the journals and having opposite longitudinal slots, guide-pins carried by the frame and passed through the respective slots, and a seed-dropping hopper located between and carried by the wheels.

2. In a seed-planter, the combination with a frame, of opposite supporting-wheels having journals, vertically-movable bearings carrying the journals and provided with opposite longitudinal slots, one end of each bearing being provided with a laterally-projected stop-flange overlapping a portion of the frame to limit the movement of the bearing, and a seed-dropping hopper located between and carried by the wheels.

3. In a seed-planter, the combination of a frame having upwardly and rearwardly inclined handles, of vertically-alined guides carried by the handles and the sides of the frame, vertically-movable bearings mounted in the guides, wheels located within the frame and having journals mounted in the respective bearings, and a seed-dropping hopper carried by and rotatable with the wheels.

4. In a seed-planter, the combination with a frame, of upper and lower guide-loops carried by opposite sides of the frame, vertically-movable bearings mounted in the respective pairs of upper and lower guide-loops and provided at opposite ends with longitudinal slots, transverse pins entering the slots, a pair of supporting-wheels located within the frame and having journals which are mounted in the respective bearings, and a seed-dropping hopper carried by and rotatable with the wheels.

5. In a seed-planter, the combination with a frame, of handles inclined upwardly and rearwardly from the front portion of the frame, alined guide-loops upon the handles and the respective sides of the frame, transverse pins extending across the loops, vertically-movable bearing-plates mounted in the respective pairs of upper and lower loops and having terminal bifurcations receiving the pins, the upper ends of the plates being provided with outwardly-directed stop-flanges overhanging the handles, a pair of supporting-wheels located within the frame and having journals mounted in the bearings, and a seed-dropping hopper carried by and rotatable with the wheels.

6. In a planter, the combination with a substantially rectangular frame, a draft connection at the forward end thereof, an opener located in rear of the draft connection, standards rising from the rear end of the frame, coverers carried by the lower ends of the standards, handles extending upwardly and rearwardly from the front of the frame and connected to the tops of the standards, vertically-alined guide-loops carried by the handles and the sides of the frame, transverse pins extending across the loops, vertically-yieldable bearing-plates mounted in the guides and having opposite terminal bifurcations receiving the pins, the tops of the bearing-plates being provided with outwardly-directed flanges overhanging the handles to limit the downward movements of the bearing-plates, a pair of supporting-wheels located within the frame and provided with journals mounted in the respective bearing-plates, a seed-dropping cylinder carried by and rotatable with the wheels, said cylinder having its greater diameter at its center and also provided with discharge-openings at its point of greatest diameter, and a covering-roller mounted within the rear portion of the frame.

In testimony that I claim the foregoing as my own I have hereto affixed my signature in the presence of two witnesses.

JESSE MOODY WALTOM.

Witnesses:
  I. L. HANSEL,
  A. H. TATE.